US012591736B2

(12) United States Patent
Reddy

(10) Patent No.: US 12,591,736 B2
(45) Date of Patent: Mar. 31, 2026

(54) FINE-TUNED LARGE LANGUAGE MODELS FOR CAPABILITY CONTROLLER

(71) Applicant: SAP SE, Walldorf (DE)

(72) Inventor: Srinivasa Byaiah Ramachandra Reddy, Bangalore (IN)

(73) Assignee: SAP SE, Walldorf (DE)

( * ) Notice: Subject to any disclaimer, the term of this patent is extended or adjusted under 35 U.S.C. 154(b) by 136 days.

(21) Appl. No.: 18/670,148

(22) Filed: May 21, 2024

(65) Prior Publication Data

US 2025/0363297 A1     Nov. 27, 2025

(51) Int. Cl.
*G10L 15/26*      (2006.01)
*G06F 40/20*      (2020.01)
(52) U.S. Cl.
CPC .................................... *G06F 40/20* (2020.01)
(58) Field of Classification Search
None
See application file for complete search history.

(56) References Cited

U.S. PATENT DOCUMENTS

| | | | | |
|---|---|---|---|---|
| 11,954,102 B1* | 4/2024 | Palaniappan | ....... | G06F 16/2237 |
| 2024/0362417 A1* | 10/2024 | Imani | ...................... | G06N 3/09 |
| 2024/0379019 A1* | 11/2024 | Naufel | .................. | G06F 40/40 |
| 2025/0094704 A1* | 3/2025 | Hu | .......................... | H04L 51/02 |
| 2025/0139447 A1* | 5/2025 | Agarwal | ................ | G06F 11/00 |
| 2025/0150377 A1* | 5/2025 | Vasseur | .................. | H04L 41/16 |
| 2025/0166020 A1* | 5/2025 | Karmarkar | ............ | G06Q 30/08 |
| 2025/0245355 A1* | 7/2025 | Grobelny | .............. | G06F 21/577 |
| 2025/0272652 A1* | 8/2025 | Makhija | ................ | G06F 40/205 |
| 2025/0307539 A1* | 10/2025 | Gupta | .................... | G06F 40/20 |
| 2025/0307542 A1* | 10/2025 | Su | .......................... | G06F 40/20 |
| 2025/0348483 A1* | 11/2025 | Malvar Maua | ..... | G06F 16/3329 |

* cited by examiner

*Primary Examiner* — Neeraj Sharma
(74) *Attorney, Agent, or Firm* — SCHWEGMAN LUNDBERG & WOESSNER, P.A.

(57)     ABSTRACT

In an example embodiment, capability definitions are leveraged to fine-tune an LLM, producing a fine-tuned LLM that is specifically designed to handle capability definitions, without the need to provide such capability definitions as input tokens to an LLM. This fine-tuned LLM has a deeper understanding of the capabilities of a system than generic LLMs.

20 Claims, 5 Drawing Sheets

200
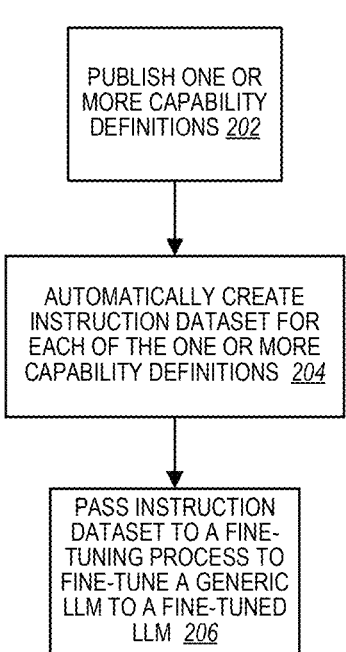
PUBLISH ONE OR MORE CAPABILITY DEFINITIONS 202
AUTOMATICALLY CREATE INSTRUCTION DATASET FOR EACH OF THE ONE OR MORE CAPABILITY DEFINITIONS 204
PASS INSTRUCTION DATASET TO A FINE-TUNING PROCESS TO FINE-TUNE A GENERIC LLM TO A FINE-TUNED LLM 206
*FIG. 2*

300

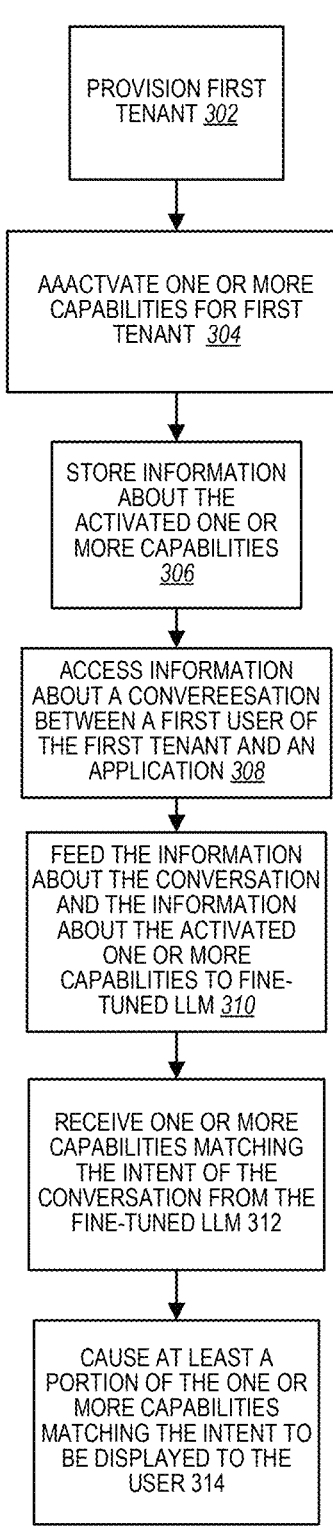

PROVISION FIRST
TENANT *302*

↓

AAACTVATE ONE OR MORE
CAPABILITIES FOR FIRST
TENANT *304*

↓

STORE INFORMATION
ABOUT THE
ACTIVATED ONE OR
MORE CAPABILITIES
*306*

↓

ACCESS INFORMATION
ABOUT A CONVEREESATION
BETWEEN A FIRST USER OF
THE FIRST TENANT AND AN
APPLICATION *308*

↓

FEED THE INFORMATION
ABOUT THE CONVERSATION
AND THE INFORMATION
ABOUT THE ACTIVATED
ONE OR MORE
CAPABILITIES TO FINE-
TUNED LLM *310*

↓

RECEIVE ONE OR MORE
CAPABILITIES MATCHING
THE INTENT OF THE
CONVERSATION FROM THE
FINE-TUNED LLM 312

↓

CAUSE AT LEAST A
PORTION OF THE ONE OR
MORE CAPABILITIES
MATCHING THE INTENT TO
BE DISPLAYED TO THE
USER 314

*FIG. 3*

FINE-TUNED LARGE LANGUAGE MODELS FOR CAPABILITY CONTROLLER

TECHNICAL FIELD

This document generally relates to computer systems. More specifically, this document relates to use of fine-tuned large language models (LLMs) for a capability controller.

BACKGROUND

Enterprise Resource Planning (ERP) software integrates into a single system various processes used to run an organization, such as finance, manufacturing, human resources, supply chain, services, procurement, and others. These processes typically provide intelligence, visibility, and efficiency across most, if not all, aspects of an organization. One example of ERP software is SAP® S/4 HANA from SAP SE of Walldorf, Germany.

A LLM refers to an artificial intelligence (AI) system that has been trained on an extensive dataset to understand and generate human language. These models are designed to process and comprehend natural language in a way that allows them to answer questions, engage in conversations, generate text, and perform various language-related tasks.

BRIEF DESCRIPTION OF DRAWINGS

The present disclosure is illustrated by way of example and not limitation in the figures of the accompanying drawings, in which like references indicate similar elements.

FIG. 2 is a flow diagram illustrating a method for generating a fine-tuned LLM for capability definitions, in accordance with an example embodiment.

FIG. 3 is a flow diagram illustrating a method for using a fine-tuned LLM, in accordance with an example embodiment.

DETAILED DESCRIPTION

Figure 1:
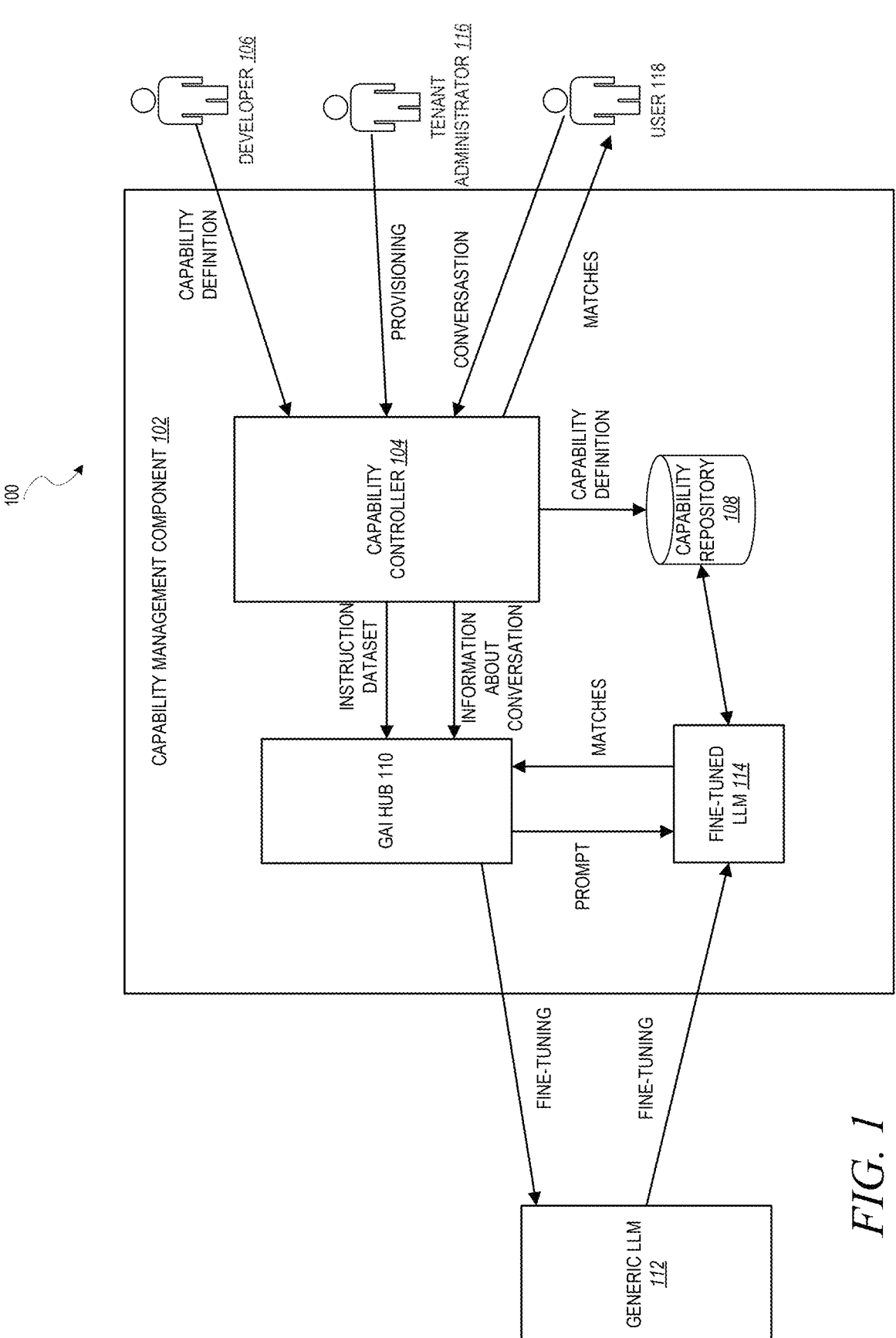
FIG. 1 is a block diagram illustrating a system for using machine learning to manage capability definitions of services in an online network, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In some cloud-based applications, a capability architecture is provided that allows entities to create services and publish capabilities of their services in an online repository that users can search. This allows users to identify capabilities of services that match their needs.

As the number of different services available to users grow, however, as entities add additional services and also as additional entities are onboarded and permitted to publish capability information, it can become unwieldly for users to find matching service through a traditional search of published capabilities.

Machine learning can be utilized to improve the matching of a user's needs with the capabilities of services in such a system, but such solutions come with technical limitations. For example, a classification model can be used to classify capabilities based on information known about those capabilities and then a similarity vector search can be run between a category of a user query (or other expressed need) and the categorized capabilities. Such models, however, are not accurate as they are unable to account for the intricacies of human language and how there may be many different ways to phrase the same thing.

Another solution would be to utilize an LLM. LLMs are trained specifically to handle the intricacies of human language, but there are still technical limitations with their use that can limit their ability to handle capability information. Specifically, as the number of possible matching capabilities rises, the input length of the input to an LLM becomes unwieldy. LLMs are caused to generate content, such as text, using a prompt. The prompt instructs the LLM as to how to generate the content and also provides context in the form of input tokens to improve the reliability of how the LLM generates that content. Many LLMs, however, have a limit on the amount of input tokens they allow. Even those that do not have a limit can have issues as the number of tokens grow, specifically because the computation time in such scenarios grows exponentially and the computation time can grow so great that results can no longer be generated in an acceptable time for most users, especially considering users are expecting real-time or near-real-time recommendations on capabilities in response to their queries.

Another solution is to use a hybrid between a vector search and an LLM, where a vector search is used to narrow down the possible capabilities and the prompt to the LLM can then include or reference only those filtered down capabilities. While this has the advantage of reducing the input token count to the LLM, the limitations of the vector search still result in the LLM producing inaccurate results.

In an example embodiment, capability definitions are leveraged to fine-tune an LLM, producing a fine-tuned LLM that is specifically designed to handle capability definitions, without the need to provide such capability definitions as input tokens to an LLM. This fine-tuned LLM has a deeper understanding of the capabilities of a system than generic LLMs.

LLMs used to generate information are generally referred to as Generative Artificial Intelligence (GAI) models. A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance.

The bidirectional encoder may be implemented as a Bidirectional Long Short-Term Memory (BiLSTM) or BERT (Bidirectional Encoder Representations from Transformers) model.

Each direction has its own hidden state, and the final output is a combination of the two hidden states.

Long Short-Term Memories (LSTMs) are a type of recurrent neural network (RNN) designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modelling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once, and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. A GAN is a supervised machine learning model that has two sub-models: a generator model that is trained to generate new examples and a discriminator model that tries to classify examples as either real or generated. The two models are trained together in an adversarial manner (using a zero-sum game according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space, or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, although a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round and, importantly, the generator is updated based on how well the generated samples fooled the discriminator.

In another example embodiment, the GAI model is a Variational AutoEncoders (VAEs) model. VAEs comprise an encoder network that compresses the input data into a lower-dimensional representation, called a latent code, and a decoder network that generates new data from the latent code. In either case, the GAI model contains a generative classifier, which can be implemented as, for example, a naïve Bayes classifier.

The present solution works with any type of GAI model, although an implementation that specifically is used with an LLM will be described.

FIG. 1 is a block diagram illustrating a system 100 for using machine learning to manage capability definitions of services in an online network, in accordance with an example embodiment. Here, a capability management component 102 may contain a capability controller 104. The capability controller 104 is designed to oversee the management of multiple capability definitions, each capability definition describing capabilities of a different service of an online network.

Each capability definition is a data structure that defines one or more capabilities of a service. A capability definition may contain multiple different sections, including an intent section, a description section, and an Application Program Interface (API) section. The description section provides a text-based description of the capability or capabilities of the corresponding service. The Intent section provides examples of intent expressions that are able to be handled by the capability or capabilities of the corresponding service, and the API section provides one or more APIs for accessing the capability or capabilities of the corresponding service.

Such capability definitions are provided to the capability controller by one or more administrators/developers (depicted here as developer 106), who may release and publish the capability definition to the capability controller 104. The developer 106 may, for example, develop the capability definition by defining intentions of the capability, create an expression dataset containing examples, as well as custom or standard entities.

The capability controller 104 may take each of these capability definitions and generate an instruction dataset to be used for fine-tuning. The capability definitions may be stored in capability repository 108.

Each instruction dataset will be stored in an object store instance that is registered with a GAI Hub 110. More particularly, the GAI Hub 110 may itself have one or more APIs for performing fine-tuning. These fine-tuning APIs may take the object store path and additional metadata and fine-tune a generic LLM 112 into a fine-tuned LLM 114.

In an example embodiment, this fine-tuning may be performed using either Parameter-Efficient Fine Tuning (PEFT) and/or Low-Rank Adaptation (LoRA) techniques.

PEFT is a method used to adapt a pre-trained model to a new task or dataset by modifying only a small fraction of the model's parameters, rather than updating all of them as in traditional fine-tuning methods. This approach is especially useful for large models, where fully updating the model can be computationally intensive and slow.

One common strategy for parameter-efficient fine-tuning involves the use of adapter modules, which are small neural networks inserted between the layers of the pre-trained model. In this setup, only the adapters are trained, leaving the original model parameters untouched. Another technique, known as prompt tuning, adds a small number of trainable parameters to the model's input to direct it towards the desired output, capitalizing on the model's ability to respond to the right context or "prompt."

Sparse fine-tuning is yet another method that updates a selectively small subset of the model's parameters, using strategies like pruning or regularization to decide which parameters to adjust. Similarly, low-rank adaptation applies a low-rank matrix approximation to the model's weight matrices, and only this approximation is fine-tuned.

LoRA is a parameter-efficient fine-tuning technique used to adapt a pre-trained model to new tasks by altering its parameters in a computationally efficient manner. The core idea behind low-rank adaptation is based on the mathematical concept of low-rank matrix approximations, which can provide a compact representation of a matrix while preserving its most significant information.

In the context of neural networks, the weights of a model can be represented as matrices. Low-Rank Adaptation involves applying a low-rank approximation to these weight matrices. This approximation decomposes a weight matrix into the product of two smaller matrices. Only these smaller matrices are updated during the fine-tuning process on a new task, while the original pre-trained model's parameters remain unchanged.

The GAI Hub 110 may provide an option to create an LLM fine-tuning scenario with training scripts. Inside the training scripts, finetuning libraries and computer code can be imported. The capability controller 104 calls the GAI Hub 110's APIs to trigger a fine-tuning training job and an identification of the instruction dataset can be provided as a parameter for the fine-tuning.

Once the fine-tuning job is completed, a fine-tuned LLM 114 created through this process can be stored. In some example embodiments, the capability controller 104 validates the accuracy of the fine-tuned LLM 114 by performing a series of tests, and if these tests are met, the fine-tuned LLM 114 may be deployed for inference.

It should be noted that the online network may include a multitenant application. This means that different tenants can be independently provisioned and data from these tenants can be segregated and isolated inside the online network. A tenant administrator 116 may perform the provisioning and select the capabilities to be activated in the tenant namespace. The capability controller 104 stores these activation details during activation of a capability by a tenant administrator 116 and configure a runtime layer to make it aware of both the tenant and their associated activated capabilities. These activated tenant capabilities are provided as available capabilities for the fine-tuned LLM 114 to match a user conversion with an available capability.

More specifically, a user 118 may engage in a conversation, such as through a chat interface, in which the user 118 indicates an intent to locate a capability that matches some sort of goal. It should be noted that this goal may not be explicitly stated, and instead may be inferred by the fine-tuned LLM 114 base on the conversion. Specifically, during a conversation with the fine-tuned LLM 114, the capability controller 104 uses to fine-tuned LLM 114 to identify an intent of the user and match that intent with an available capability (also considering which capabilities are activated for this tenant). This functionality may be provided by, for example, one or more inference APIs of the GAI Hub 110. These inference APIs may take the current user conversation as input. The inference result includes one or more matching capabilities. If multiple capabilities are matched, the fine-tuned LLM 114 returns them with confidence scores that allow for the ranking of the returned capabilities.

FIG. 2 is a flow diagram illustrating a method 200 for generating a fine-tuned LLM for capability definitions, in accordance with an example embodiment. At operation 202, one or more capability definitions are published in an online network. Each capability definition describes at least one capability of a different service of the online network. At operation 204, an instruction dataset is automatically created for each of the one or more capability definitions. At operation 206, the instruction dataset for the one or more capability definitions is passed to a fine-tuning process to fine tune a generic LLM into a fine-tuned LLM.

FIG. 3 is a flow diagram illustrating a method 300 for using a fine-tuned LLM, in accordance with an example embodiment. Here, at operation 302, a first tenant is provisioned in an online network. This provisioning means that any data from the first tenant is isolated from data from other tenants. At operation 304, one or more capabilities are activated for the first tenant. At operation 306, information about the activated one or more capabilities is stored.

At operation 308, information about a conversation engaged in between a first user of the first tenant and an application in the online network is accessed. This application may be, for example, a chat application. At operation 310, the information about the conversation and the information about the activated one or more capabilities are fed to the fine-tuned LLM with a prompt requesting that the fine-tuned LLM return one or more capabilities matching an intent of the first user reflected in the conversation. At operation 312, one or more capabilities matching the intent are received from the fine-tuned LLM. At operation 314, at least a portion of the one or more capabilities are caused to be displayed to the user, such as via a graphical user interface and/or via the chat application.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations comprising: accessing one or more capability definitions of an online network, each capability definition being a data structure containing information about one or more capabilities of a service of the online network; automatically generating an instruction dataset for each of the one or more capability definitions; fine-tuning a large language model (LLM) to produce a fine-tuned LLM, based on the one or more instruction datasets; accessing conversation information regarding a conversation between a first user and an application of the online network; sending the conversation information along with a prompt to the fine-tuned LLM, the prompt instructing the fine-tuned LLM
to identify one or more capability definitions matching an
intent of the first user as reflected in the conversation;
receiving, from the fine-tuned LLM, one or more matching
capability definitions; and causing display, to the user, of the
one or more matching capability definitions.

In Example 2, the subject matter of Example 1 includes,
wherein the operations further comprise: provisioning a first
tenant of the online network, the first user being part of the
first tenant; activating one or more capabilities for the first
tenant, producing activated capability information; and
wherein the sending the conversation information comprises
sending the conversation information and the activated
capability information along with a prompt to the fine-tuned
LLM, the prompt instructing the fine-tuned LLM to identify
one or more capability definitions matching an intent of the
first user as reflected in the conversation, with the one or
more capability definitions matching the intent being
selected from the activated one or more capabilities for the
first tenant.

In Example 3, the subject matter of Examples 1-2
includes, wherein the fine-tuning comprises using Param-
eter-Efficient Fine-Tuning.

In Example 4, the subject matter of Examples 1-3
includes, wherein the fine-tuning comprises using Low-
Rank Adaptation.

In Example 5, the subject matter of Examples 1-4
includes, wherein the conversation occurs in a chat appli-
cation and the causing display comprises causing display of
the one or more matching capability definitions in the chat
application.

In Example 6, the subject matter of Examples 1-5
includes, wherein the fine-tuning comprises calling a fine-
tuning Application Program Interface (API) with identifica-
tion(s) of the one or more instruction datasets as a parameter.

In Example 7, the subject matter of Examples 1-6
includes, wherein each capability definition comprises a
description section, an intent section, and an API section, the
description section comprising a text description of a cor-
responding capability of a service, the intent section con-
taining one or more example of requests that can be made of
the corresponding capability, and the API section compris-
ing one or more APIs for accessing the corresponding
capability.

Example 8 is a method comprising: accessing one or more
capability definitions of an online network, each capability
definition being a data structure containing information
about one or more capabilities of a service of the online
network; automatically generating an instruction dataset for
each of the one or more capability definitions; fine-tuning a
large language model (LLM) to produce a fine-tuned LLM,
based on the one or more instruction datasets; accessing
conversation information regarding a conversation between
a first user and an application of the online network; sending
the conversation information along with a prompt to the
fine-tuned LLM, the prompt instructing the fine-tuned LLM
to identify one or more capability definitions matching an
intent of the first user as reflected in the conversation;
receiving, from the fine-tuned LLM, one or more matching
capability definitions; and causing display, to the user, of the
one or more matching capability definitions.

In Example 9, the subject matter of Example 8 includes,
provisioning a first tenant of the online network, the first
user being part of the first tenant; activating one or more
capabilities for the first tenant, producing activated capabil-
ity information; and wherein the sending the conversation
information comprises sending the conversation information and the activated capability information along with a prompt
to the fine-tuned LLM, the prompt instructing the fine-tuned
LLM to identify one or more capability definitions matching
an intent of the first user as reflected in the conversation,
with the one or more capability definitions matching the
intent being selected from the activated one or more capa-
bilities for the first tenant.

In Example 10, the subject matter of Examples 8-9
includes, wherein the fine-tuning comprises using Param-
eter-Efficient Fine-Tuning.

In Example 11, the subject matter of Examples 8-10
includes, wherein the fine-tuning comprises using Low-
Rank Adaptation.

In Example 12, the subject matter of Examples 8-11
includes, wherein the conversation occurs in a chat appli-
cation and the causing display comprises causing display of
the one or more matching capability definitions in the chat
application.

In Example 13, the subject matter of Examples 8-12
includes, wherein the fine-tuning comprises calling a fine-
tuning Application Program Interface (API) with identifica-
tion(s) of the one or more instruction datasets as a parameter.

In Example 14, the subject matter of Examples 8-13
includes, wherein each capability definition comprises a
description section, an intent section, and an API section, the
description section comprising a text description of a cor-
responding capability of a service, the intent section con-
taining one or more example of requests that can be made of
the corresponding capability, and the API section compris-
ing one or more APIs for accessing the corresponding
capability.

Example 15 is a non-transitory machine-readable medium
storing instructions which, when executed by one or more
processors, cause the one or more processors to perform
operations comprising: accessing one or more capability
definitions of an online network, each capability definition
being a data structure containing information about one or
more capabilities of a service of the online network; auto-
matically generating an instruction dataset for each of the
one or more capability definitions; fine-tuning a large lan-
guage model (LLM) to produce a fine-tuned LLM, based on
the one or more instruction datasets; accessing conversation
information regarding a conversation between a first user
and an application of the online network; sending the
conversation information along with a prompt to the fine-
tuned LLM, the prompt instructing the fine-tuned LLM to
identify one or more capability definitions matching an
intent of the first user as reflected in the conversation;
receiving, from the fine-tuned LLM, one or more matching
capability definitions; and causing display, to the user, of the
one or more matching capability definitions.

In Example 16, the subject matter of Example 15
includes, wherein the operations further comprise: provi-
sioning a first tenant of the online network, the first user
being part of the first tenant; activating one or more capa-
bilities for the first tenant, producing activated capability
information; and wherein the sending the conversation infor-
mation comprises sending the conversation information and
the activated capability information along with a prompt to
the fine-tuned LLM, the prompt instructing the fine-tuned
LLM to identify one or more capability definitions matching
an intent of the first user as reflected in the conversation,
with the one or more capability definitions matching the
intent being selected from the activated one or more capa-
bilities for the first tenant.

9
10

In Example 17, the subject matter of Examples 15-16 includes, wherein the fine-tuning comprises using Parameter-Efficient Fine-Tuning.

In Example 18, the subject matter of Examples 15-17 includes, wherein the fine-tuning comprises using Low-Rank Adaptation.

In Example 19, the subject matter of Examples 15-18 includes, wherein the conversation occurs in a chat application and the causing display comprises causing display of the one or more matching capability definitions in the chat application.

In Example 20, the subject matter of Examples 15-19 includes, wherein the fine-tuning comprises calling a fine-tuning Application Program Interface (API) with identification(s) of the one or more instruction datasets as a parameter.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 4:
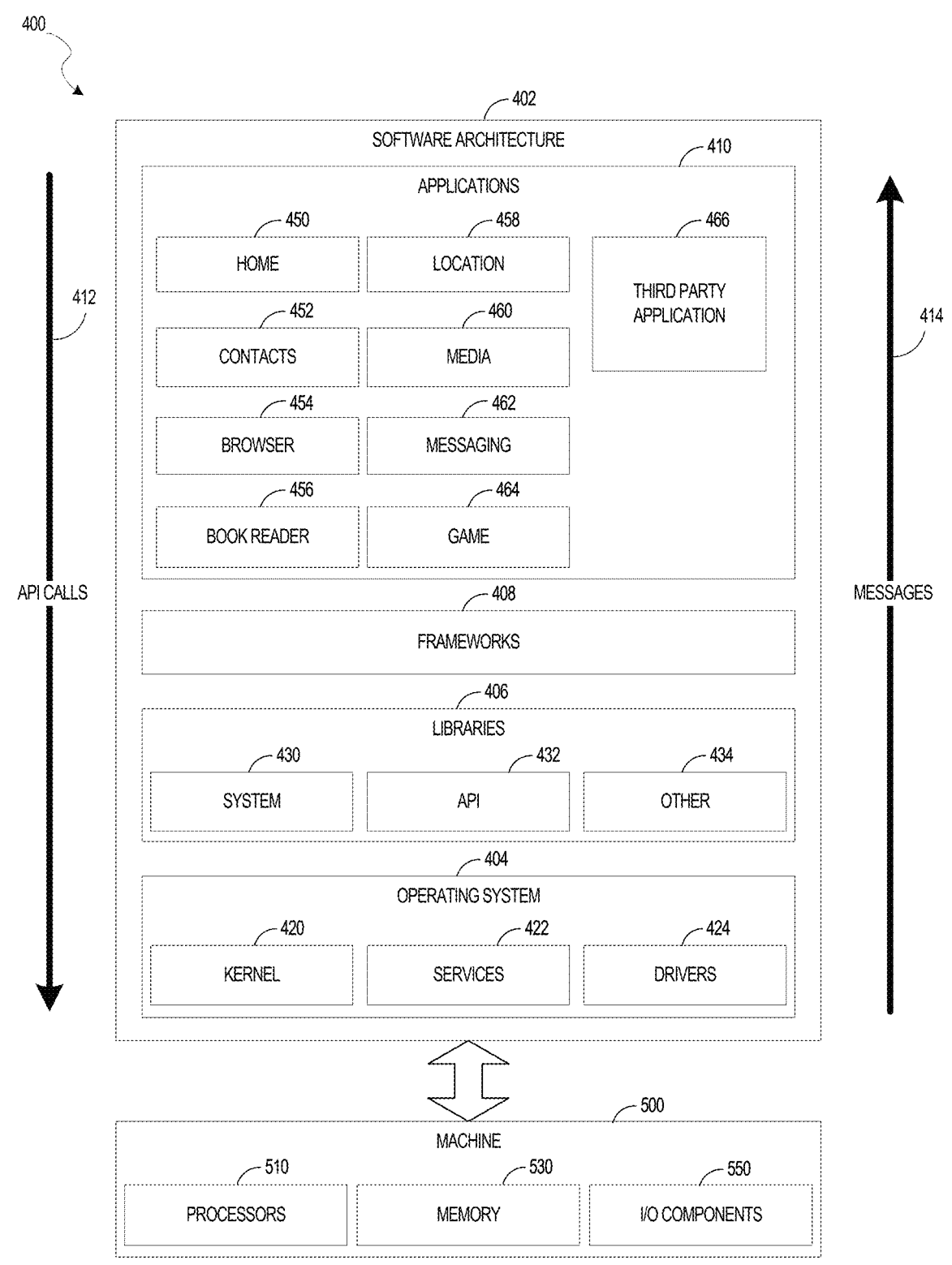
FIG. 4 is a block diagram illustrating an architecture of software, which can be installed on any one or more of the devices described above.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionalities. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various graphical user interface functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
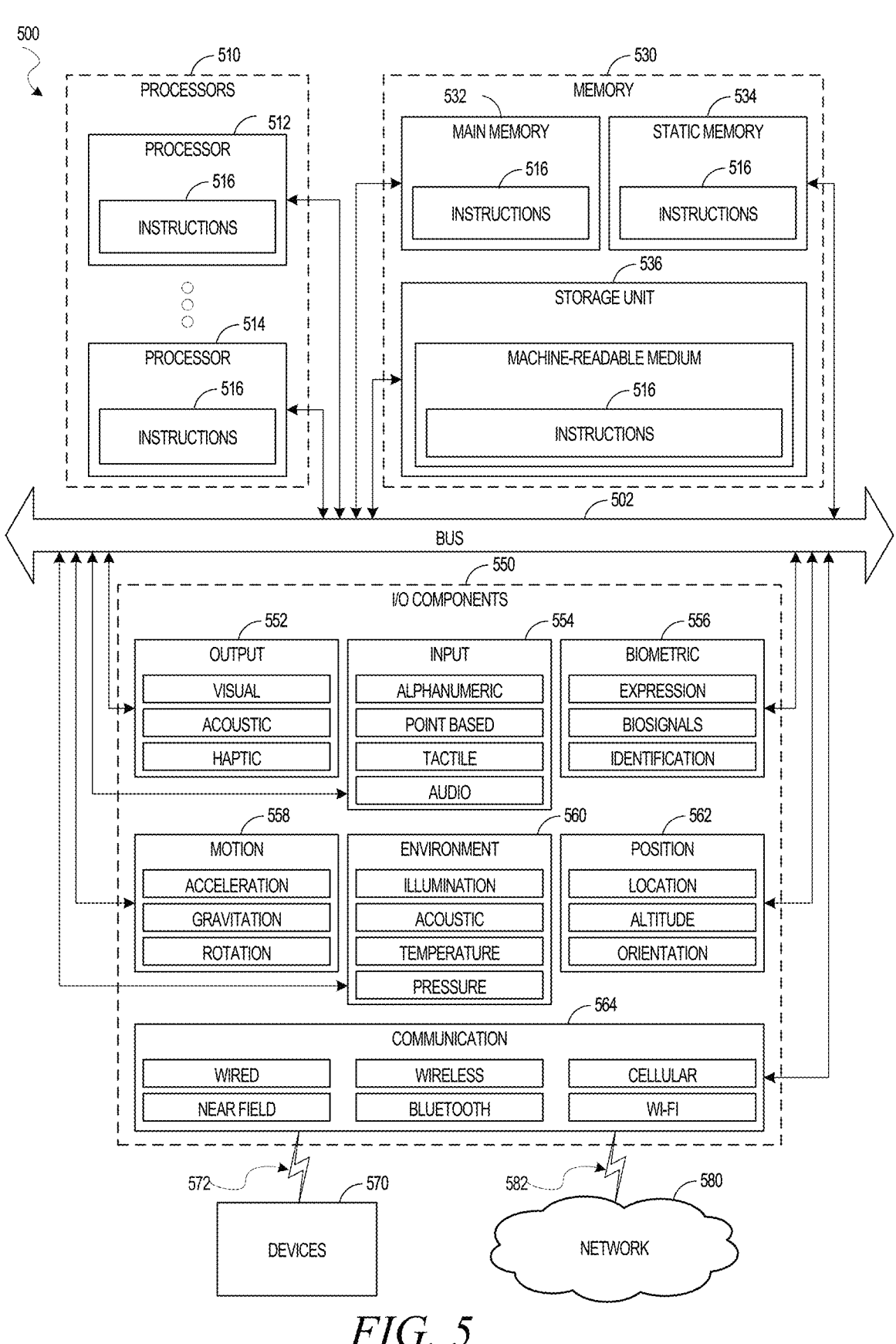
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 300 of FIG. 3. Additionally, or alternatively, the instructions 516 may implement FIGS. 1-3 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (e.g., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling

582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   accessing one or more capability definitions of services offered by a software architecture, the one or more capability definitions stored in a repository of the software architecture and each capability definition containing information about one or more capabilities of a corresponding service offered by the software architecture;
   automatically generating an instruction dataset for each of the one or more capability definitions;
   fine-tuning a large language model (LLM), located outside of the software architecture, to produce a fine-tuned special-purpose LLM, based on the instruction datasets;
   accessing conversation information regarding a conversation between a first user and an application of the system;
   sending the conversation information along with a prompt to the fine-tuned special-purpose LLM, the prompt instructing the fine-tuned special-purpose LLM to identify one or more capability definitions matching an intent of the first user as reflected in the conversation;

receiving, from the fine-tuned special-purpose LLM, one or more matching capability definitions; and causing display, to the first user, of the one or more matching capability definitions.

2. The system of claim 1, wherein the operations further comprise:

provisioning a first tenant of the system, the first user being part of the first tenant; and activating one or more capabilities for the first tenant, producing activated capability information;

wherein the sending the conversation information comprises sending the conversation information and the activated capability information along with the prompt to the fine-tuned special-purpose LLM, the prompt instructing the fine-tuned special-purpose LLM to identify one or more capability definitions matching an intent of the first user as reflected in the conversation, with the one or more capability definitions matching the intent being selected from the activated capability information one or more capabilities for the first tenant.

3. The system of claim 1, wherein the fine-tuning comprises using Parameter-Efficient Fine-Tuning.

4. The system of claim 1, wherein the fine-tuning comprises using Low-Rank Adaptation.

5. The system of claim 1, wherein the conversation occurs in a chat application and the causing display comprises causing display of the one or more matching capability definitions in the chat application.

6. The system of claim 1, wherein the fine-tuning comprises calling a fine-tuning Application Program Interface (API) with identification(s) of the instruction datasets as a parameter.

7. The system of claim 1, wherein each capability definition comprises a description section, an intent section, and an API section, the description section comprising a text description of a corresponding capability of a service, the intent section containing one or more example of requests that can be made of the corresponding capability, and the API section comprising one or more APIs for accessing the corresponding capability.

8. A method comprising:

accessing one or more capability definitions of services offered by a software architecture, the one or more capability definitions stored in a repository of the software architecture and each capability definition containing information about one or more capabilities of a corresponding service offered by the software architecture;

automatically generating an instruction dataset for each of the one or more capability definitions;

fine-tuning a large language model (LLM), located outside of the software architecture, to produce a fine-tuned special-purpose LLM, based on the instruction datasets;

accessing conversation information regarding a conversation between a first user and an application of the system;

sending the conversation information along with a prompt to the fine-tuned special-purpose LLM, the prompt instructing the fine-tuned special-purpose LLM to identify one or more capability definitions matching an intent of the first user as reflected in the conversation;

receiving, from the fine-tuned special-purpose LLM, one or more matching capability definitions; and

causing display, to the first user, of the one or more matching capability definitions.

9. The method of claim 8, further comprising:

provisioning a first tenant of the system, the first user being part of the first tenant; and activating one or more capabilities for the first tenant, producing activated capability information;

wherein the sending the conversation information comprises sending the conversation information and the activated capability information along with the prompt to the fine-tuned special-purpose LLM, the prompt instructing the fine-tuned special-purpose LLM to identify one or more capability definitions matching an intent of the first user as reflected in the conversation, with the one or more capability definitions matching the intent being selected from the activated capability information one or more capabilities for the first tenant.

10. The method of claim 8, wherein the fine-tuning comprises using Parameter-Efficient Fine-Tuning.

11. The method of claim 8, wherein the fine-tuning comprises using Low-Rank Adaptation.

12. The method of claim 8, wherein the conversation occurs in a chat application and the causing display comprises causing display of the one or more matching capability definitions in the chat application.

13. The method of claim 8, wherein the fine-tuning comprises calling a fine-tuning Application Program Interface (API) with identification(s) of the instruction datasets as a parameter.

14. The method of claim 8, wherein each capability definition comprises a description section, an intent section, and an API section, the description section comprising a text description of a corresponding capability of a service, the intent section containing one or more example of requests that can be made of the corresponding capability, and the API section comprising one or more APIs for accessing the corresponding capability.

15. A non-transitory machine-readable medium storing instructions which, when executed by one or more processors, cause the one or more processors to perform operations comprising:

accessing one or more capability definitions of services offered by a software architecture, the one or more capability definitions stored in a repository of the software architecture and each capability definition containing information about one or more capabilities of a corresponding service offered by the software architecture;

automatically generating an instruction dataset for each of the one or more capability definitions;

fine-tuning a large language model (LLM), located outside of the software architecture, to produce a fine-tuned special-purpose LLM, based on the instruction datasets;

accessing conversation information regarding a conversation between a first user and an application of the system;

sending the conversation information along with a prompt to the fine-tuned special-purpose LLM, the prompt instructing the fine-tuned special-purpose LLM to identify one or more capability definitions matching an intent of the first user as reflected in the conversation;

receiving, from the fine-tuned special-purpose LLM, one or more matching capability definitions; and causing display, to the first user, of the one or more matching capability definitions.

16. The non-transitory machine-readable medium of claim 15, wherein the operations further comprise:

provisioning a first tenant of the system, the first user being part of the first tenant; and activating one or more capabilities for the first tenant, producing activated capability information;

wherein the sending the conversation information comprises sending the conversation information and the activated capability information along with the prompt to the fine-tuned special-purpose LLM, the prompt instructing the fine-tuned special-purpose LLM to identify one or more capability definitions matching an intent of the first user as reflected in the conversation, with the one or more capability definitions matching the intent being selected from the activated capability information one or more capabilities for the first tenant.

17. The non-transitory machine-readable medium of claim 15, wherein the fine-tuning comprises using Parameter-Efficient Fine-Tuning.

18. The non-transitory machine-readable medium of claim 15, wherein the fine-tuning comprises using Low-Rank Adaptation.

19. The non-transitory machine-readable medium of claim 15, wherein the conversation occurs in a chat application and the causing display comprises causing display of the one or more matching capability definitions in the chat application.

20. The non-transitory machine-readable medium of claim 15, wherein the fine-tuning comprises calling a fine-tuning Application Program Interface (API) with identification(s) of the instruction datasets as a parameter.

* * * * *